UNITED STATES PATENT OFFICE.

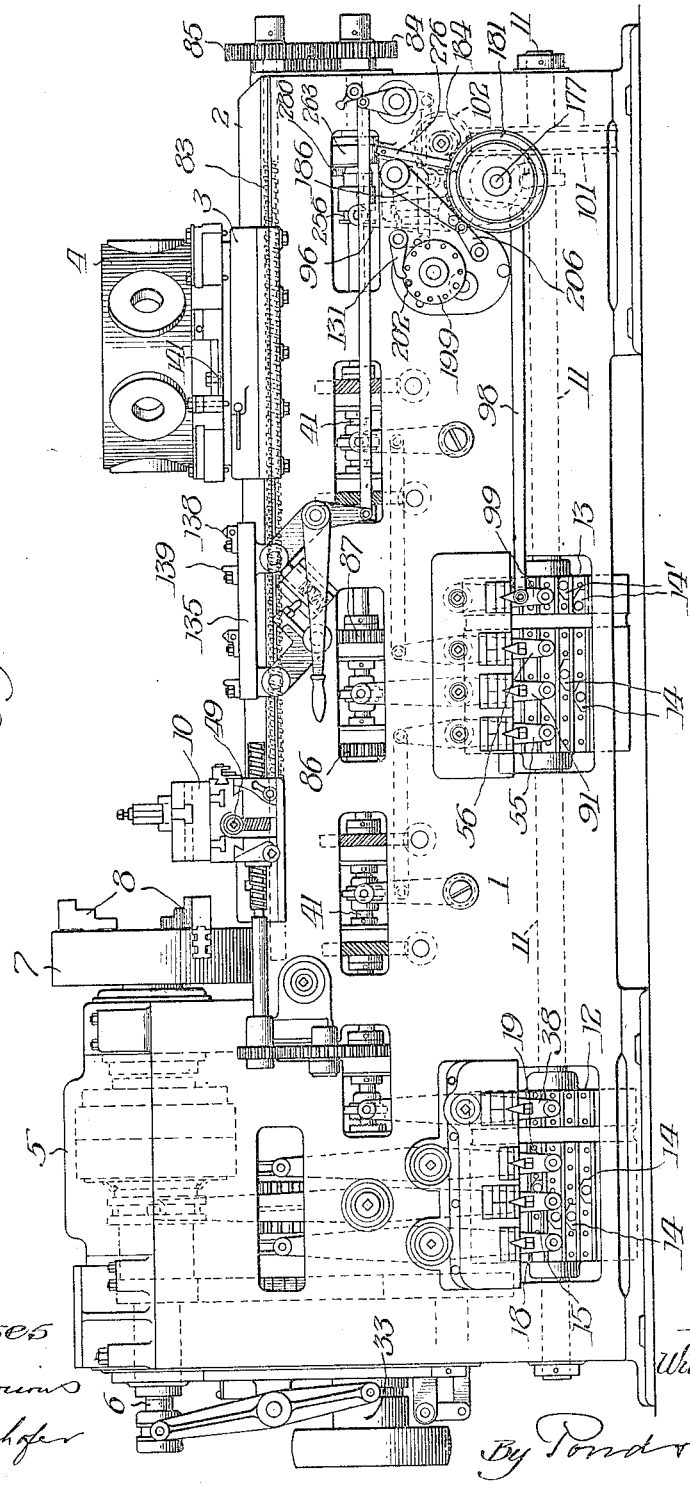

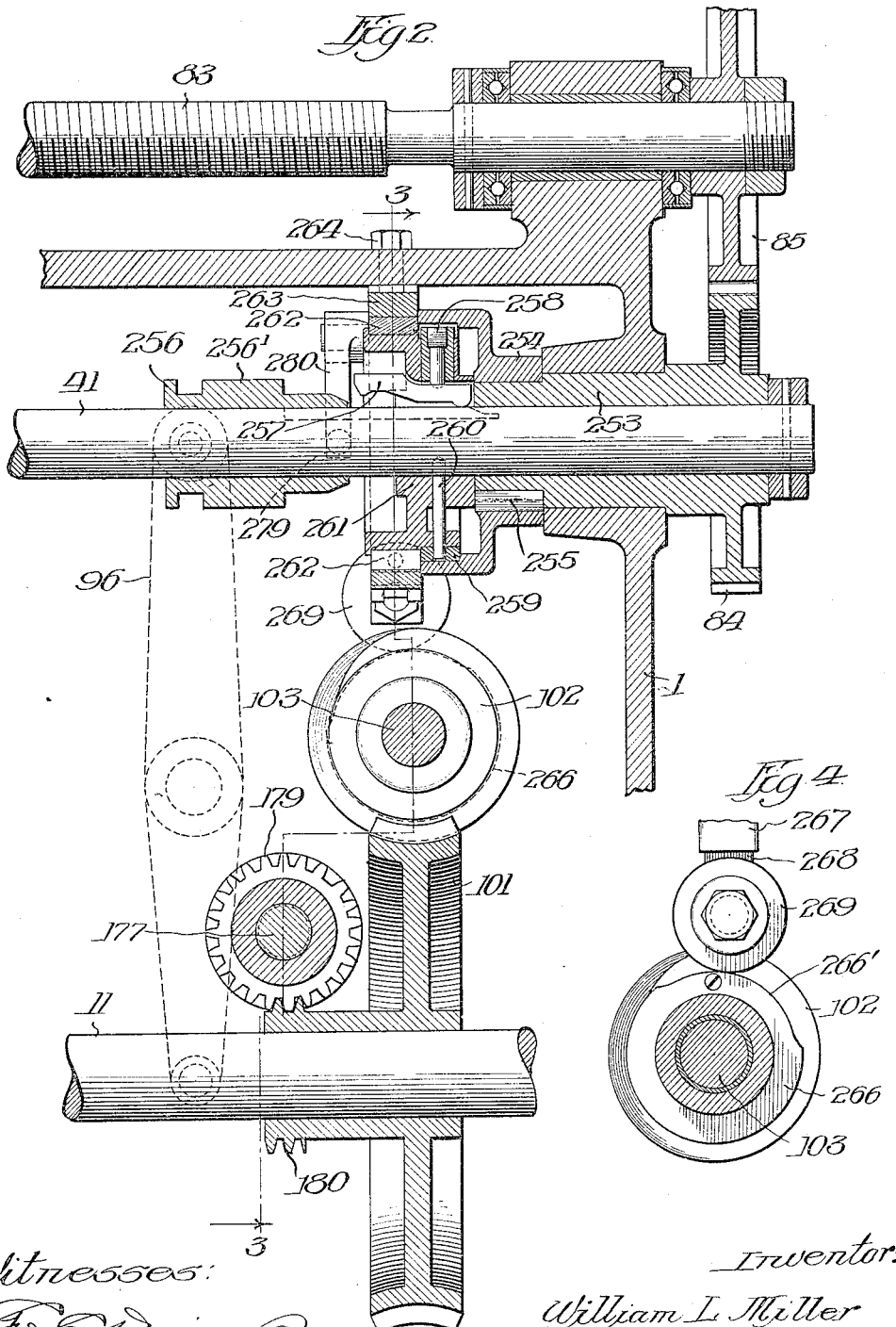

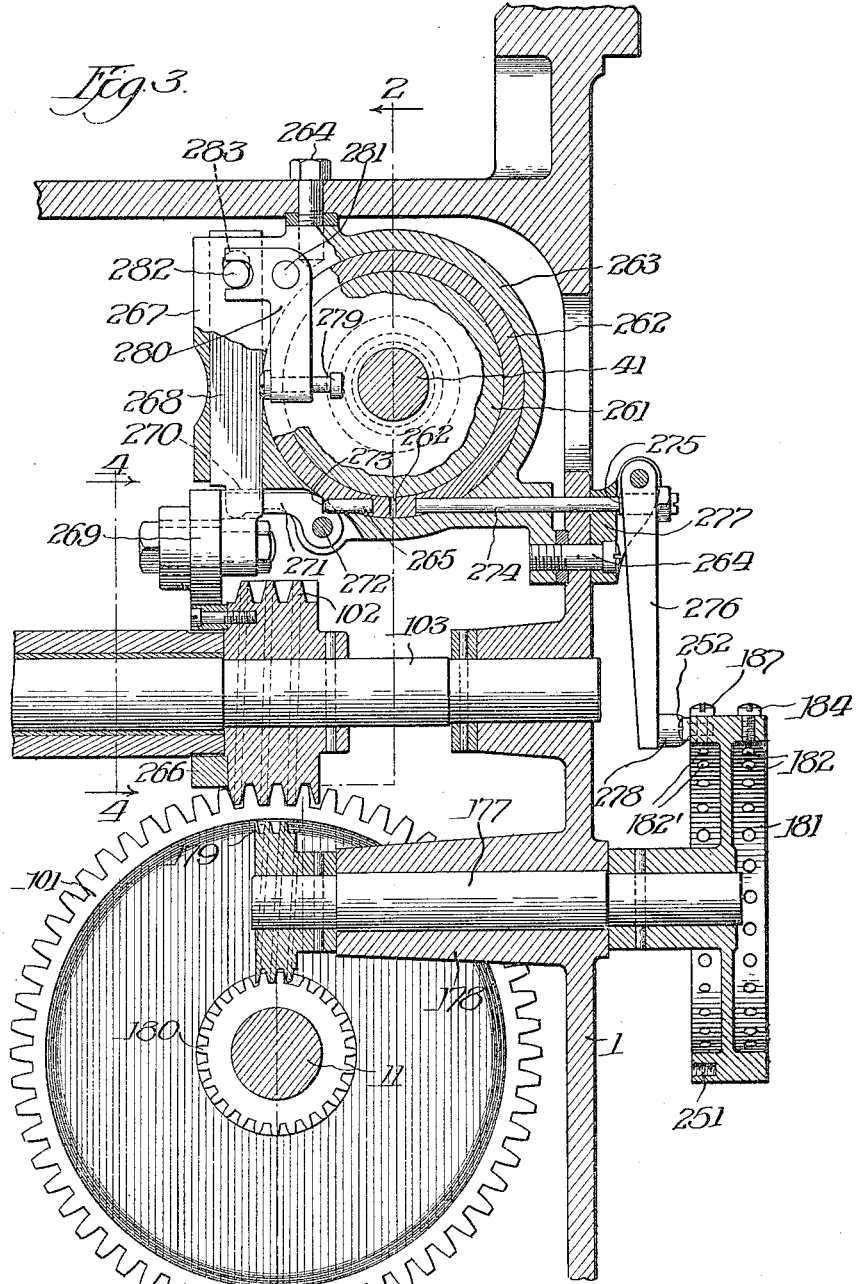

WILLIAM L. MILLER, OF MADISON, WISCONSIN, ASSIGNOR TO GISHOLT MACHINE COMPANY, OF MADISON, WISCONSIN, A CORPORATION OF WISCONSIN.

AUTOMATIC BRAKE FOR LATHES.

1,139,555.      Specification of Letters Patent.      Patented May 18, 1915.

Application filed July 18, 1914. Serial No. 851,714.

*To all whom it may concern:*

Be it known that I, WILLIAM L. MILLER, a citizen of the United States, residing at Madison, in the county of Dane and State of Wisconsin, have invented certain new and useful Improvements in Automatic Brakes for Lathes, of which the following is a specification.

The general purpose or object of the present invention is to render more perfect and efficient the operation of lathes by holding the cutting tool firmly engaged with the work at all times, not only during the cutting operations but also when shifting the tool holder from one feed to another or from a traverse motion to a feed or while revolving the work without any feed to remove tool marks. In many lathes, owing to the more or less considerable train of gear between the power shaft and the turret, cross slide, or other tool holder, there is considerable back-lash in the gear train; in consequence of which, in changing from one feed to another or when the feed is interrupted for any other purpose, the tool holder tends to settle back more or less from the face of the work, requiring such back-lash to be overcome before the tool is restored to operative engagement with the work. This fault is particularly objectionable in cases where, having completed the desired feed of the tool holder, it is desired to remove the tool marks by allowing the chuck to rotate one or more times with no feed on. In such a case, where the tool holder settles back, owing to the back-lash referred to, it is obviously impossible to completely efface the tool marks from the work.

The particular embodiment of the invention herein illustrated and described has been designed more especially for application to and use in connection with the automatic turret lathe shown and described in my former Letters Patent No. 1,081,396, granted December 16, 1913; but it will be understood that the principle of the invention is readily applicable to the feed or lead screw of any standard turret or engine lathe.

Referring to the accompanying drawings—Figure 1 is a side elevation of the automatic turret lathe forming the subject matter of my Letters Patent above referred to, and is a substantial reproduction of Fig. 1 of the drawings of the said patent; Fig. 2 is an enlarged vertical sectional view substantially on the offset line 2—2 of Fig. 3; Fig. 3 is an enlarged detail view, partly in elevation and partly in transverse vertical section substantially on the irregular line 3—3 of Fig. 2; Fig. 4 is a detail vertical section on the line 4—4 of Fig. 3.

I will first briefly describe the principal operating parts of the lathe illustrated in Fig. 1, for a fuller description of which reference may be had to the specification and drawings of my former Patent No. 1,081,396, above referred to; and I will then describe in detail my present improvement, which is shown chiefly in the detail views, Figs. 2, 3 and 4.

In the drawings, 1 designates the substantially rectangular frame or housing of the machine, at one end of which is located the head stock mechanism designated as an entirety by 5, which carries a spindle 6 terminating at its inner end in a chuck head 7 equipped with the usual chuck jaws 8.

10 designates the cross slide mounted on suitable ways transverse to the machine frame or bed, said cross slide having the functions of the usual tool carrying cross slide that moves toward and from the work in a direction at right angles to the axis of the spindle.

On the usual parallel V-shaped ways 2 is mounted the turret slide 3 carrying a rotatable turret head 4; the turret slide 3 being traversed and fed toward and from the chuck by the usual longitudinal lead screw 83.

Extending lengthwise and substantially centrally of the lower portion of the housing and suitably journaled in or near the end wall thereof is a drum shaft 11, keyed or otherwise secured on which are a pair of intermittently moving drums 12 and 13. Each of these drums is provided on its surface with a series of longitudinal channels adapted to receive and support detachable and reversible cam blocks 14. These cam blocks serve, as their respective drums are turned, to engage the lower ends of certain levers which throw into and out of action, and control the speeds or rates of feed of, various operating parts of the machine. Certain of the cam blocks on the drum 12, through engagement with clutch shifting levers 15, 18 and 19, control the speeds of rotation of the spindle 6 through the back gear mechanism. Other cam blocks on the drum 12, through a clutch shifting lever 38, control the inward and outward traverse and feed movements of the cross slide 10. Certain of the cam blocks on drum 13, through engagement with clutch-shifting levers 55 and 56, serve to impart, through the usual change gears (not shown) different speeds of rotation to an intermediate shaft 41 that is geared to the lead screw 83 of the turret and to the feed screw 49 of the cross slide, whereby different feed movements are transmitted to the turret and cross slide. Other cam blocks on the drum 13, through a clutch-shifting lever 91 and oppositely rotating spur gears 86 and 87 on the intermediate shaft 41 that are driven at a constant speed from the main pulley shaft 33, serve to effect the rapid back and forward traverse of the turret and cross slide. The intermediate shaft 41 is geared to the turret lead screw 83 by spur gears 84 and 85 on said intermediate shaft and lead screw respectively; the spur gear 84 on the intermediate shaft having a clutch-controlled connection with the latter, as hereinafter described, operated by a lever 96 which through a link 98 and lever 99 is actuated by certain other cams on the drum 13.

The drum shaft 11 and drums 12 and 13 are intermittently turned or indexed by a mechanism that is tripped into action by the turret and cross slide at the proper points in their forward and backward travel (or may be manually tripped into action) to effect changes in feed, or a change from rapid traverse to feed, or a back traverse of the tool carrier (turret or cross slide). Those parts of this drum indexing mechanism with which my present improvements directly coöperate are shown mainly in the detail views, Figs. 2 and 3, and comprise the following parts: Fast on the drum shaft 11 is a worm gear 101 that is driven by a worm 102 keyed to a worm shaft 103 journaled between the side walls of the frame or housing. 177 designates a short shaft journaled in a boss 178 on the frame 1 and carrying at its inner end a spiral gear 179 meshing with a spiral gear 180 of the same size formed on the hub of the worm 101. Keyed on the outer end of the shaft 177 is an index dial 181. At uniform intervals in and around one side of the periphery of the dial 181 are a series of tapped holes 182 adapted to receive screws 184. At similar spaced intervals in and around the other side of the periphery of the dial 181 are another series of holes 182' adapted to receive screws 187; and in and around the inner edge of the periphery of the dial 181 are a third series of tapped holes 251 adapted to receive screws 252.

The worm shaft 103 is intermittently actuated through a single revolution to index the drums 12 and 13 through an interval of one space by a mechanism fully shown and described in my former Letters Patent No. 1,081,396, above referred to, and to which reference may be had for a complete understanding thereof as well as for a disclosure of the complete machine shown in Fig. 1 and partially described above. This mechanism, as shown in my said patent, includes a normally idle clutch, one part of which is geared to the pulley shaft and rotates continuously, while the other part is geared to the worm shaft 103 and is normally idle except when connected up to the continuously rotating member to effect the described indexing of the drum shaft and drums. This indexing mechanism is, in the case of the turret, tripped into action through the agency of a depressible table 135 (Fig. 1), tripping blocks 138 and 139 adjustably mounted on said table, and coöperating tripping blocks 141 carried by the turret, and is automatically tripped out of action when the worm shaft 103 has made one revolution, all as described in my former patent referred to. One function of the index dial 181 is to provide means whereby, after the last operation has been performed upon a given piece of work requiring a less number of operations than are provided for by the spacing of the drums, the drums can be continuously indexed around to the zero or starting point. To this end, a number of screws 184 are applied to the holes 182 corresponding to the unused spaces of the drums, and the rounded heads of these screws coöperate with a lever arm 186 which, when raised by the heads of the screws, permits the drum indexing mechanism to rotate continuously until said arm passes off the head of the last screw 184, by which time the drums will have been brought around to the zero or starting point, all as fully disclosed in my former patent above specified. Another function of the index dial 181, which it performs through the agency of the screws 187, is to control a timer mechanism which is brought into play whenever it is desired to arrest a feed after the chuck spindle has revolved a predetermined number of times either for effecting a fine facing feed with a broad shaving cutter or for removing the tool marks when no feed is engaged; this mechanism being controlled through the engagement and disengagement of an arm 206 with the heads of the screws 187; the period through which the spindle is permitted to rotate being controlled by adjustable studs 202 on a dial disk 199 coöperating with an arm 131 that controls the tripping devices of the drum indexing mechanism, all as fully disclosed in my former patent, above identified.

The parts of the machine as thus far described correspond in all substantial respects with the automatic turret lathe shown and described in my said Patent No. 1,081,396, with the exception of slight modification in the index dial 181 and the parts carried thereby, and, for more convenient reference, I have identified the several parts and elements thus far described by the same reference numerals that are employed to identify corresponding parts and elements in the said patent.

Coming now to a description of my present improvements, which are in the nature of a brake attachment for preventing backlash in the driving gear of the turret and cross slide, but which may, with some modification, be applicable to the feed or lead screw of any standard turret or engine lathe, 253 designates an elongated hub of the spur gear 84 that runs loose on the intermediate shaft 41 and carries a friction ring 254 keyed thereon as indicated at 255. The hub 253 is made fast with the shaft 41 when the turret is driven in either direction by the lead screw 83 through the agency of a follower 256 slidably mounted on the shaft 41 and actuated by the lever 96, said follower operating, through cam engagement with a lever 257 to expand, through a wedge-block 258, a split friction ring 259 that is secured to the shaft 41 by a pin 260, and, when expanded, frictionally engages the interior of the friction ring 254.

261 designates a friction hub on which the friction ring 259 is mounted and which is also secured to the shaft 41 and the friction ring 259 by the pin 260. This friction hub 261 is turned to receive a band brake ring 262 which, in turn, is mounted in and supported by a bracket 263 in this instance secured to the frame of the machine by screws 264. The two ends of the band brake ring 262 are normally slightly separated, as shown in Fig. 3 and the left hand end portion of said ring, as shown in said figure, is engaged by a pin 265. This pin 265 is given a slight endwise movement sufficient to tighten the band brake ring 262 on the friction hub 261 when the opposite end of the ring is held stationary at certain times when the drums are indexed by the following mechanism. Secured to one side of the worm 102 is a cam 266 conveniently formed as a ring or collar having a part of its circumference milled away as shown at 266' in Fig. 4.

Mounted to slide vertically in a guide 267, which may be conveniently formed as a part of the bracket 263, is a bar 268 on the lower end of which is journaled a roller 269 that engages the periphery of the cam 266. In a lateral recess or socket 270 of the bar 268 is received one end of a lever 271 that is pivoted at 272 in the bracket 263 and is formed with a vertical shoulder 273 that engages the outer end of the pin 265. From this it will be apparent that each time the worm shaft 103 makes a revolution in indexing the drums, the bar 268 will be raised slightly through engagement of the roller 269 with the high portion of the cam, thereby, through the lever 271 imparting an endwise movement to the pin 265 and to that end of the band brake ring 262 engaged by the pin 265. If the opposite end of the band brake ring were secured against movement, it is obvious that the brake would operate each time that the worm shaft 103 made a revolution to index the drums; but as this is not necessary, the said other end of the band brake ring is unsecured so as to be capable of yielding, and means are provided for holding the same against yielding at such times as it is desired to make the brake effective. Such means consists of a pin 274 slidably mounted in the bracket 263 and at its inner end engaging a recess or socket in the opposite end of the band brake ring to that engaged by the pin 265. The outer end of the pin 264 bears against an adjustable stop 275 mounted in a depending lever arm 276 that is pivotally suspended from a bracket 277 carried by the main frame 1. On the lower end of the lever arm 276 is a plug 278 that lies opposite the inner edge of the peripheral rim of the index dial 181 and is adapted to be engaged by the heads of screws 252 so as to lock the pin 274 and the end of the brake-ring engaged thereby against yielding at such times as it is desired to apply the brake.

As already indicated, another object of the mechanism of this invention is to hold the tool holder in a fixed position when no cut is being taken; that is, when it is desired that the turret or cross slide shall remain in a fixed position during a few revolutions of the spindle for the purpose of removing the tool marks. This is accomplished by the same band brake mechanism in connection with the follower 256. When this follower is shifted to the right (Fig. 2) by the lever 96 the required amount to engage the friction rings 254 and 259, and drive the turret through the lead screw, the band brake is in a released position. When the feed is tripped and the drum starts to index, the cam 266 raises the roller 269 and the vertical bar 268 and holds the latter in a raised position for one-half or more of its revolution. If, at this time, the pin 274 is held stationary by the means described, this suffices to hold the brake applied during the shifting from one feed to another or from a traverse to a feed movement. In a case where it is desired to hold the tool holder against back-lash during a number of spindle revolutions to remove a tool mark, this operation will ordinarily occupy more time than is represented by a revolution of the cam 266. Hence, in order to retain the band brake applied during such period, the follower 256 is provided with a diametrically enlarged rear portion 256'; and the drum 13 is provided with cam blocks 14' of somewhat greater than normal length whereby the follower 256 is shifted endwise to such an extent that its enlarged portion 256' comes opposite an adjustable stud 279 carried in the lower end of an elbow lever 280 that is pivoted at 281 in the bracket 263 and has a forked horizontal arm engaging a pin 282 projecting laterally from the bar 268 and playing through a slot 283 in the wall of the guide or casing 267. In this way, the engagement of the enlarged portion 256' of the follower 256 with the stud 279 when the bar 268 is raised by the cam 266 to permit such engagement maintains the bar 268 raised, and consequently maintains the brake ring in applied position until released on the next indexing movement of the drum by an oppositely acting cam 14'. It will thus be seen that by reason of the mechanism last described when the cam 266 has completed its revolution and the drum stops indexing, the vertical bar 268 cannot drop down on account of the engagement of the adjustable stud 279 with the enlarged portion 256' of the follower 256, and consequently, the band brake 262 is locked on the hub 261 which in turn holds the shaft 41 and the lead-screw 83 from rotating and therefore holds the turret in a fixed position until the spindle timer hereinbefore mentioned trips the drum indexing mechanism and brings the special drum block 14' into position for throwing the follower 256 back to central position.

From the foregoing it will be readily apparent how the mechanism described accomplishes the stated objects of the invention. All the movements of both the turret and the cross slide are transmitted through the intermediate shaft 41. In effecting the changes in the feed movements, or whenever any forward movement of the turret or cross slide is intermitted, there is an instant when the intermediate shaft 41 is free; and it is during these periods, when the shaft 41 is free, that the brake mechanism is brought into play to rigidly clamp the shaft 41 to the frame of the machine so that no backlash or yield is possible between the shaft 41 and the pulley or driving shaft 33 of the machine.

It will be manifest to those skilled in the art that the principle of the invention is not limited to the specific application herein shown and described but may, with more or less modification as to details, be readily applied to effect the control of the lead or feed screw of any standard turret or engine lathe. Hence, I do not limit the invention to the particular embodiment disclosed except to the extent clearly indicated in specific claims

I claim:

1. In an automatic brake mechanism for lathes, the combination with a tool carrier, of a feed mechanism therefor including a feed-changing mechanism, a brake mounted for engagement with an element of said feed mechanism, and automatic means for applying said brake during the interval in changing from one feed to another.

2. In an automatic brake mechanism for lathes, the combination with a tool carrier, of a feed mechanism therefor including a rotatable shaft and feed changing mechanism operative to transmit different speeds of rotation to said shaft, a brake in controlling relation to said shaft, and automatic means for applying said brake during the interval in changing from one speed to another.

3. In an automatic brake mechanism for lathes, the combination with a tool carrier, of a feed-screw therefor, a rotatable shaft in driving relation to said feed-screw, a brake drum fast with said shaft, a brake mounted in coöperative relation to said brake drum, mechanism operative to transmit different speeds of rotation to said shaft, and automatic means for applying said brake during the interval in changing from one speed to another.

4. In an automatic brake mechanism for lathes, the combination with a tool carrier, of a feed mechanism therefor including a feed-changing mechanism, intermittently operating means for actuating said feed-changing mechanism at predetermined points in the travel of the tool carrier, a brake mounted for engagement with an element of said feed mechanism, and means for applying said brake controlled and operated by said actuating means of said feed-changing mechanism.

5. In an automatic brake mechanism for lathes, the combination with a tool carrier, of a feed screw therefor, a rotatable shaft in driving relation to said feed screw, a brake-drum fast with said shaft, a band-brake mounted on said brake-drum, feed-changing mechanism operative to transmit different speeds of rotation to said shaft, intermittently operating means for actuating said feed-changing mechanism, connections between said intermittently operating means and one end of said band-brake for tightening the latter on said brake-drum, and means for holding the other end of said band-brake against yielding during any predetermined movement or movements of said intermittently operating means.

6. In an automatic brake mechanism for lathes, the combination with a tool-carrier, of a feed screw therefor, a rotatable shaft in driving relation to said feed screw, a brake-drum fast with said shaft, a band-brake mounted on said brake-drum, feed-changing mechanism operative to transmit different speeds of rotation to said shaft, means including an intermittently rotating worm shaft for actuating said feed-changing mechanism, a cam on said worm-shaft, means actuated by said cam engaging one end of said band-brake for tightening the latter on said brake-drum during each rotation of said worm-shaft, and means for holding the other end of said band-brake against yielding during any predetermined rotation or rotations of said worm-shaft.

7. In an automatic brake mechanism for lathes, the combination with a chuck-spindle and a tool carrier, of a feed mechanism for said tool carrier, means for throwing said feed mechanism into and out of action, a brake adapted to engage an element of said feed mechanism when the latter is idle, means for effecting a predetermined number of spindle revolutions when said feed mechanism is idle, and means for holding said brake applied during said predetermined number of spindle revolutions.

8. In an automatic brake mechanism for lathes, the combination with a chuck-spindle and a tool carrier, of a feed screw for said tool carrier, a rotatable shaft in driving relation to said feed screw, a brake-drum fast with said shaft, a brake mounted in coöperative relation to said brake-drum, feed-changing mechanism operative to transmit different speeds of rotation to said shaft, automatic means for applying said brake during one or more predetermined operations of said feed-changing mechanism, means for effecting a predetermined number of spindle revolutions when said shaft is idle and no feed is engaged, and means for holding said brake applied during said predetermined number of spindle revolutions.

WILLIAM L. MILLER.

Witnesses:
H. J. PARKE,
J. M. OLSEN.

Copies of this patent may be obtained for five cents each, by addressing the "Commissioner of Patents, Washington, D. C."